(12) United States Patent
Ogumi et al.

(10) Patent No.: US 8,449,628 B2
(45) Date of Patent: May 28, 2013

(54) LITHIUM BATTERY AND MANUFACTURING METHOD THEREOF

(75) Inventors: Zempachi Ogumi, Kyoto (JP); Yasutoshi Iriyama, Kyoto (JP); Takeshi Abe, Kyoto (JP); Chihiro Yada, Kyoto (JP)

(73) Assignee: Kyoto University, Kyoto-shi (JP)

(*) Notice: Subject to any disclaimer, the term of this patent is extended or adjusted under 35 U.S.C. 154(b) by 636 days.

(21) Appl. No.: 11/814,591

(22) PCT Filed: Nov. 11, 2005

(86) PCT No.: PCT/JP2005/020695
§ 371 (c)(1),
(2), (4) Date: Jul. 24, 2007

(87) PCT Pub. No.: WO2006/080126
PCT Pub. Date: Aug. 3, 2006

(65) Prior Publication Data
US 2008/0145751 A1 Jun. 19, 2008

(30) Foreign Application Priority Data
Jan. 25, 2005 (JP) ................. 2005-017638

(51) Int. Cl.
*H01M 4/82* (2006.01)
*H01M 10/0562* (2010.01)
*H01M 4/13* (2010.01)
*B01J 19/08* (2006.01)
*H01M 10/04* (2006.01)
*H01M 10/052* (2010.01)

(52) U.S. Cl.
CPC ........... *H01M 10/04* (2013.01); *B01J 19/08* (2013.01); *H01M 10/052* (2013.01)
USPC ........ 29/623.1; 427/457; 429/322; 429/231.2

(58) Field of Classification Search
USPC ....... 429/231.2, 231.5, 231.95, 322; 427/457; 29/623.1, 623.5
See application file for complete search history.

(56) References Cited

U.S. PATENT DOCUMENTS
4,117,103 A * 9/1978 Hong ................ 423/594.15
5,273,847 A * 12/1993 Plichta et al. ............ 429/322
(Continued)

FOREIGN PATENT DOCUMENTS
JP        02225310 A  *  9/1990
JP        6-111831 A      4/1994
(Continued)

OTHER PUBLICATIONS

"The reactive DC-magnetron Sputtering Process", Institute of Physics, RWTH Aachen University. Web site: http://ia.physik.rwth-aachen.de/research/sputtering/www-sputter-eng.pdf. Accessed on: Jan. 28, 2009. (Page first avaialbe on Jul. 1, 2003.).*

(Continued)

*Primary Examiner* — Edu E Enin-Okut
(74) *Attorney, Agent, or Firm* — Westerman, Hattori, Daniels & Adrian, LLP (57) ABSTRACT

Disclosed are an inexpensive all-solid-state lithium battery and a group of batteries having a small internal resistance. The electrode active material of the battery is formed on the surface of a solid electrolyte (it may be a crystal or a glass material) containing lithium ion such as $Li_{3.4}V_{0.6}Si_{0.4}O_4$ and a Li—Ti—Al—P—O based glass material by exerting ion impact, high voltage application (e.g., about 400 V) and the like on the surface to react it. The resultant battery comprises the solid electrolyte and an electrode active material composed of a decomposition product of the solid electrolyte and provided on at least one side of the solid electrolyte. One obtainable by accumulating a plurality of the batteries serves as a group of batteries.

13 Claims, 9 Drawing Sheets

(a)

(b)

U.S. PATENT DOCUMENTS

| | | | |
|---|---|---|---|
| 5,312,623 A * | 5/1994 | Plichta et al. | 429/231.95 |
| 5,338,625 A * | 8/1994 | Bates et al. | 429/322 |
| 6,030,909 A * | 2/2000 | Fu | 429/319 |
| 2003/0162094 A1* | 8/2003 | Lee et al. | 429/231.95 |
| 2006/0216611 A1* | 9/2006 | Ugaji et al. | 429/322 |

FOREIGN PATENT DOCUMENTS

| | | |
|---|---|---|
| JP | 10-83838 A | 3/1998 |
| JP | 2001-15152 A | 1/2000 |
| JP | 2000-251938 A | 9/2000 |
| JP | 2001-126757 A | 5/2001 |
| WO | WO 2004093236 A1 * | 10/2004 |

OTHER PUBLICATIONS

"What is Sputtering?". Retrieved Jul. 30, 2009 from AJA International, Inc. Web site: http://www.ajaint.com/whatis.htm.*

International Search Report of PCT/JP2005/020695, date of mailing Feb. 14, 2006.

* cited by examiner

LITHIUM BATTERY AND MANUFACTURING METHOD THEREOF

TECHNICAL FIELD

The present invention relates to a lithium battery comprising a solid electrolyte and a manufacturing method thereof.

BACKGROUND ART

A lithium battery in widespread used as an advanced battery at present comprises a liquid electrolyte containing an organic solvent. It is known that such an organic solvent causes a decomposition reaction by oxidation or reduction on the surface of an electrode active material. Then, this decomposition reaction causes formation of a resistive layer at an interface between an electrode active material and an electrolyte. The resistive layer irreversibly increases with time or by repetition of charge-discharge reaction to irreversibly increase battery resistance. As a result, battery performance lowers to reduce battery life. Furthermore, the aforementioned organic solvent is inflammable and therefore it is very expensive in providing measures for safety.

Consequently, some proposals have been made to develop batteries composed of only a nonflammable solid. A method for manufacturing an all-solid-state lithium battery, for example, disclosed in Japanese Unexamined Patent Publication No. 2000-251938, is characterized in that solid electrolyte powder is interposed between positive and negative electrode active materials containing a solid electrolyte to be sealed after microwave heating. A lithium battery disclosed in Japanese Unexamined Patent Publication No. 2001-126757 is one in which an oxide based inorganic solid electrolyte is interposed between a positive electrode and a negative electrode to be formed by binding electrode active materials with oxide glass.

DISCLOSURE OF THE INVENTION

Problems to be Solved by the Invention

However, both proposals need to be integrated by laminating after separately forming the electrode active material and the solid electrolyte and therefore it is expensive. Furthermore, since respective particles are only mixed in micron order at the interface between the electrode active material and the solid electrolyte, both are not microscopically coupled and consequently this impedes reduction in electric charge movement resistance.

Therefore, an object of the present invention is to provide an all-solid-state lithium battery with low cost and small internal resistance.

Means for Solving the Problem

To achieve the object, a method for manufacturing a lithium battery in the present invention is characterized in that an electrode active material is formed on the surface of a solid electrolyte containing a lithium ion by reacting the surface of the solid electrolyte.

According to the method, the electrode active material is formed by reacting the surface of the solid electrolyte and therefore a further process of bonding the both is not required. Furthermore, there can be obtained an electricity generating element in which a boundary portion between the electrode active material and the solid electrolyte has a component concentration inclined in atomic order from one toward the other.

Thus, there is obtained a lithium battery comprising a solid electrolyte containing a lithium ion, and an electrode active material composed of a decomposition product of the solid electrolyte and provided on at least one side of the solid electrolyte; the lithium battery characterized in that the solid electrolyte and the electrode active material continue without other materials except for a transition layer composed of these phases.

According to the lithium battery, the solid electrolyte and the electrode active material continue without other materials except for a transition layer composed of these phases and therefore electric charge movement resistance at the interface is small.

Effects of the Invention

The number of process is reduced and internal resistance is also small and therefore a battery with low cost and high output can be obtained and expansion of application field can be expected.

BEST MODE FOR CARRYING OUT THE INVENTION

As the aforementioned solid electrolyte, there may be exemplified a compound such as composite metal oxide or composite metal sulfide, containing more than one element selected from Ti, V, Mn, Fe, Co, Ni, Si, and Sn. Among these, one including vanadium is preferable, e.g., a compound represented by the general formula $Li_{4-x}V_xM_{1-x}O_4$ (M is any of Si, Ti, or Ge; and x is a number which is larger than 0 and smaller than 1). It is because that an electrode active material like vanadium oxide, which easy performs insertion or desorption of lithium, can be formed from such a solid electrolyte. Furthermore, as the aforementioned solid electrolyte, Li—Ti—Al—P—O based glass ceramic materials are preferable, because the electrode active material can be easily formed on the surface by electrolysis.

The aforementioned reaction can be conducted, for example, by at least one means selected from ion impact, high voltage application, laser irradiation, radical irradiation by a radical gun or the like, electromagnetic wave irradiation, electron impact, heat impact such as being dipped in molten iron, pressure impact by ultrasonic wave or the like, ion exchange, oxidation and/or reduction, oxidation and/or reduction arising from voltage application, and carburizing, against the aforementioned solid electrolyte. Reaction mechanism differs depending on each means. For example, when impact is applied by ion containing oxygen, the solid electrolyte is oxidized so that a specific element such as lithium is separated therefrom as a lithium compound. As a result, an oxide layer not containing lithium is formed on the surface of the solid electrolyte, and this becomes the electrode active material. If reaction is conducted on both sides of the solid electrolyte, a positive electrode active material and a negative electrode active material can be formed at the same time.

EXAMPLE

Examples 1 to 3 and Comparative Example 1

A plate-like crystalline solid electrolyte $Li_{3.4}V_{0.6}Si_{0.4}O_4$ was manufactured by solid-phase reaction and this was served as a target to which ion impact was exerted with a high frequency magnetron sputtering apparatus (made by Osaka Vacuum Ltd., Type OSV250) at a frequency of 13.56 MHz, the amount of gas flow to be described later, a pressure of 4 Pa, and an output of 150 W for 24 hours. After that, the target was reversed and ion impact was exerted in the same conditions to obtain three types of electricity generating elements.

Lithium batteries of the Examples 1 to 3 were manufactured by forming current collectors by sputtering platinum on both sides of each electricity generating element. Then, a positive electrode of a direct current power source was connected to one current collector of the respective batteries and a negative electrode was connected to the other current collector; charging was made to a voltage of 4.0 V at a constant current of a current value 10 nA and the charging was continued for approximately 12 hours at 4.0 V; and then discharge capacity was measured by discharging to 1.5 V at the same current. A product for comparison was manufactured by sputtering platinum on both sides without exerting ion impact to the aforementioned solid electrolyte, and it was also subjected to measurement of discharge capacity in the same conditions. The measured result is shown in Table 1.

TABLE 1

|  | AMOUNT OF GAS FLOW WHEN ION IMPACT IS EXERTED (cc/min) | DISCHARGE CAPACITY (mAh/g) |
|---|---|---|
| Example 1 | Ar100 | 1.5 |
| 2 | Ar50 + $O_2$50 | 12.8 |
| 3 | $O_2$100 | 10.5 |
| Comparative Example 1 | — | 0 |

Figure 1:
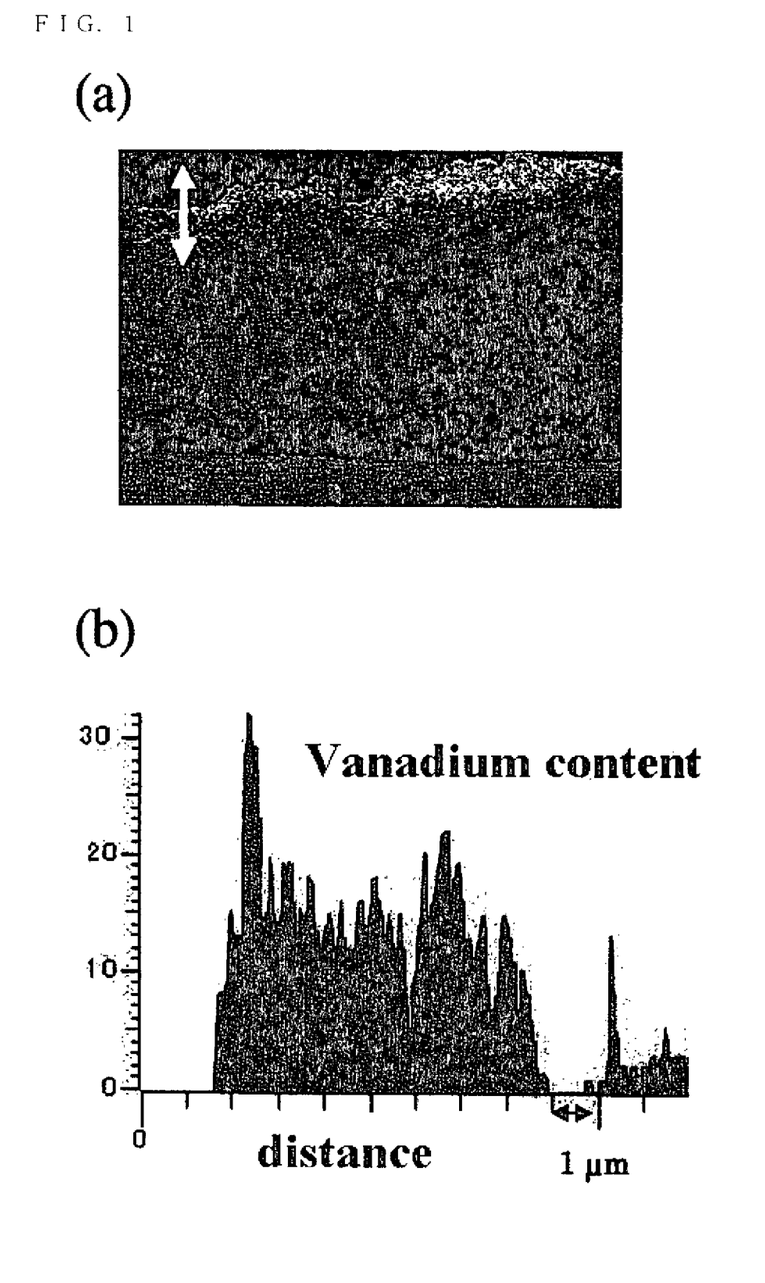
FIG. 1(a) is a scanning electron microscopy image of an impact exerting portion on a solid electrolyte according to an example.
FIG. 1(b) is an Auger analysis pattern at a range shown by both arrow marks shown in FIG. 1(a).

Next, when the impact exerting portion of Example 2 was scanned from the surface toward the inside with an Auger microprobe (made by JEOL Ltd., Type Jamp7800F) with point resolution 5 nm, data shown in FIG. 1 was obtained. FIG. 1(a) is a scanning electron microscopy image (photographing magnification: 10000 times) showing a side of the impact exerting portion; and FIG. 1(b) is an Auger analysis pattern at a range shown by the both arrow marks shown in FIG. 1(a), where a horizontal axis is distance and a vertical axis is the amount of vanadium. As shown in FIG. 1, the amount of vanadium relatively increased in the vicinity of the surface, as compared with the inside.

Example 4

An electricity generating element was manufactured in the same conditions as Example 2 except for that exerting time of the ion impact was set to 5 hours in place of 24 hours. Separately, an electrolyte solution was prepared by dissolving $LiClO_4$ in propylene carbonate (referred to as PC) so as to be concentration of 1 M.

A positive electrode current collector was formed by sputtering platinum on one surface of the electricity generating element, and lithium metal was faced on the opposite surface through the electrolyte solution as a negative electrode. Then, charge-discharge capacity was measured while operation, in which discharging was performed so that a battery voltage became to 2.0 V at a constant current of 10 nA and charging was performed to become to 3.0 V at the same current, was repeated four times. The measured result is shown in FIG. 2.

Figure 2:
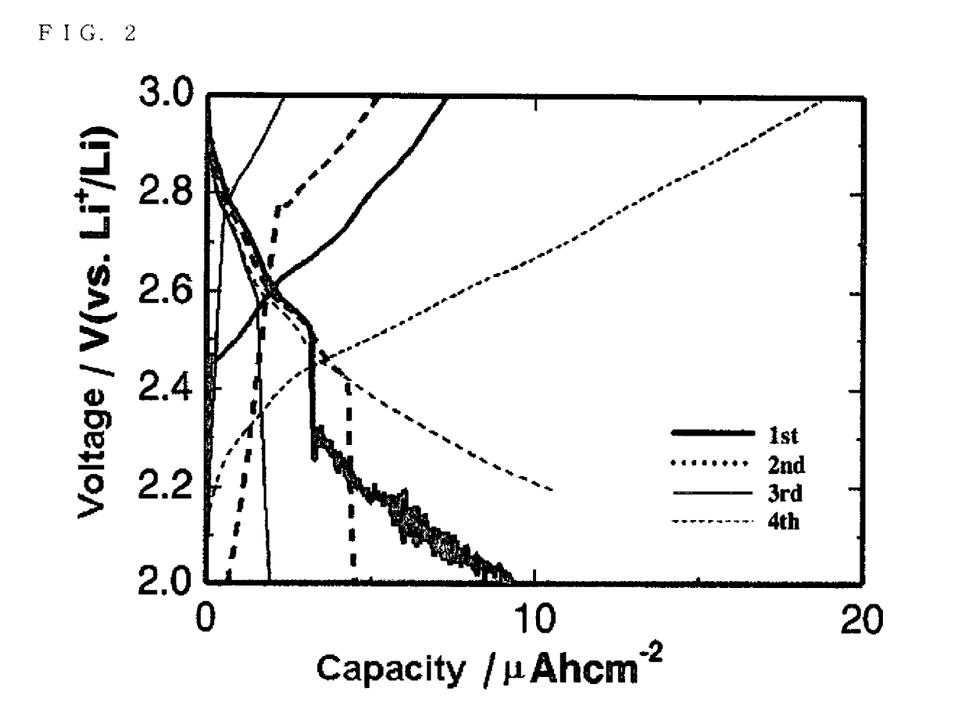
FIG. 2 is a graph showing a relationship between capacity and electrode voltage when charging and discharging a battery according to Example 4.

As shown in FIG. 2, it was turned out that a substance formed on the surface of the solid electrolyte by the ion impact repeated insertion and desorption of lithium ion. Moreover, the capacity increased when charging and discharging at fourth time and therefore it showed that the substance was good as an active material.

Example 5 and Comparative Example 2

A sheet made of Li—Ti—Al—P—O based glass ceramic material (made by OHARA INC., LIC-GC) with a thickness of 1 mm and an ionic conductivity of $1.0 \times 10^{-4}$ S·cm$^{-1}$ (25° C.) was prepared. ($Li_2CO_3$+$MnO_2$) powder (Li:Mn=7:10) was served as a target and a Li—Mn—O thin film was formed on the surface of the glass ceramic sheet under conditions of a pressure of 23 Pa, a laser irradiation energy of 100 mJcm$^{-2}$, and an irradiation time of one hour with a laser abrasion device (made by Japan Storage Battery Co., Ltd., Type EXL-210). Current collectors were formed by sputtering platinum on the thin film and copper on the other surface of the glass ceramic sheet respectively, thereby to manufacture a laminated body. Then, a voltage of 400 V was applied to the laminated body for 3 seconds by connecting a positive electrode of a direct current power source to the platinum and a negative electrode to the copper. After that, as a result of observing the surface on the platinum side with a scanning electron microscopy, there were countless holes. It shows that oxygen desorption from the Li—Mn—O thin film and the glass ceramic sheet was performed with voltage application and at the same time a lithium ion moved to the copper side.

Figure 3:
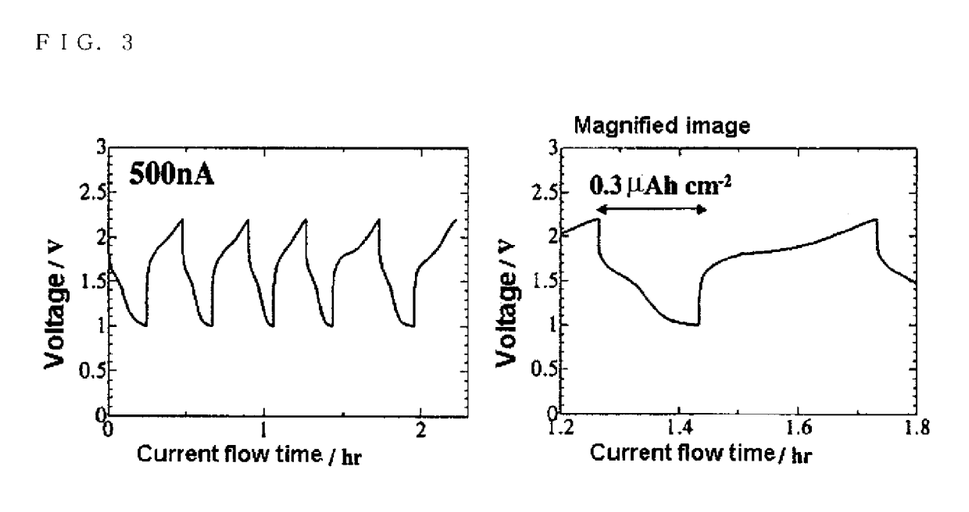
FIG. 3 is a graph showing a relationship between time and battery voltage when charging and discharging a battery according to Example 5.

Next, discharge and charge capacity was measured while operation, in which the laminated body was discharged so that electrode potential of the copper side became to 1.0 V at a constant current of 500 nA and charging was performed to become to 2.2 V, was repeated. The measured result is shown in FIG. 3. In FIG. 3, a graph shown on the right is an enlarged view of a horizontal axis of a graph shown on the left.

For comparison, after manufacturing another laminated body, attempts of repetition of charging and discharging operation were made without applying a voltage of 400 V. The measured result of the charge-discharge capacity at this time is shown in FIG. 4.

Figure 4:
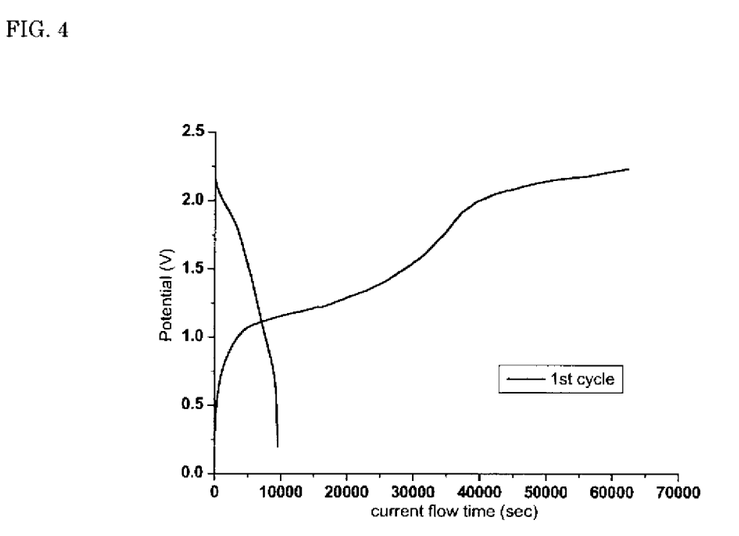
FIG. 4 is a graph showing a relationship between time and battery voltage when charging and discharging a battery according to Comparative Example 2.

It is shown by contrast with FIGS. 3 and 4 that little reversibility of charge-discharge capacity was observed before a voltage of 400 V was applied to the laminated body (Comparative Example 2) and whereas reversible discharge capacity became 0.3 µAhcm$^{-2}$ after the voltage of 400 V was applied (Example 5). Therefore, it shows that an electrode active material made of decomposition product of glass ceramic was formed on the surface of the glass ceramic sheet by the voltage application.

Example 6

Figure 5:
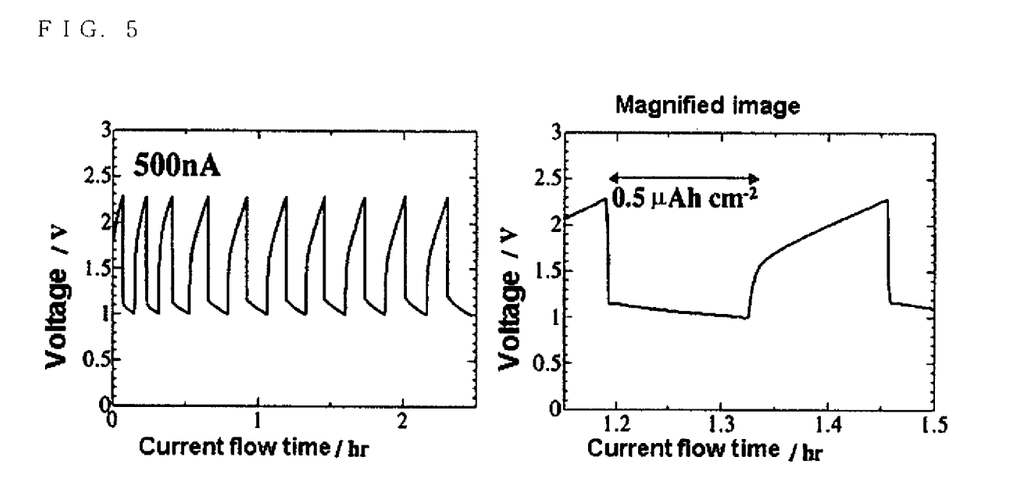
FIG. 5 is a graph showing a relationship between time and battery voltage when charging and discharging a battery according to Example 6.

A laminated body was manufactured in the same conditions as Example 5 except for that a Li—Co—O thin film was formed on the surface of a glass ceramic sheet in place of the Li—Mn—O thin film, and charge-discharge capacity was measured. ($Li_2CO_3+Co_3O_4$) powder (molar ratio 7:5) was used as a target for forming the Li—Co—O thin film. The measured result is shown in FIG. 5. As in the case of Example 5, it showed good charge-discharge characteristics.

Example 7

Figure 6:
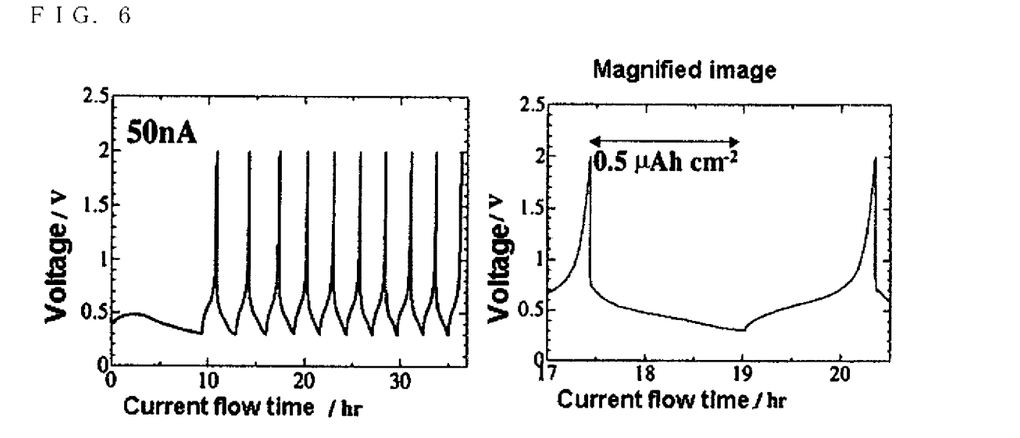
FIG. 6 is a graph showing a relationship between time and battery voltage when charging and discharging a battery according to Example 7.

A laminated body was formed by sputtering manganese on one surface of the same glass ceramic sheet as prepared in Example 5 and copper on the other surface thereof. Then, a positive and a negative electrode of a direct current power source were connected to the manganese thin film and the copper thin film respectively to electrolyze the laminated body at a constant current of 10 µA for 250 seconds under an atmosphere at 80° C. After that, charge-discharge capacity was measured while operation, in which the laminated body was discharged till a battery voltage became to 0.4 V at a constant current of 50 nA and charged to 2.0 V, was repeated. The measured result is shown in FIG. 6. In FIG. 6, a graph shown on the right is an enlarged view of a horizontal axis of a graph shown on the left. As in the case of Example 5, it showed good charge-discharge characteristics.

Example 8

Powder made of a Li—Ti—Al—P—O based glass ceramic material (made by OHARA INC., LIC-GC) with an average particle diameter of 1 µm (D=50) and an ionic conductivity of $1.2 \times 10^{-3}$ S·cm$^{-1}$ (25° C.) was prepared. The glass ceramic powder, acetylene black (carbon powder), and polyvinylidene fluoride (referred to as PVdF) were mixed in a weight ratio (70:15:15) to form a paste. The paste was applied to a nickel sheet. The nickel sheet was served as a positive electrode current collector and lithium metal was faced as a negative electrode through the same electrolyte solution as one prepared in Example 4.

Figure 7:
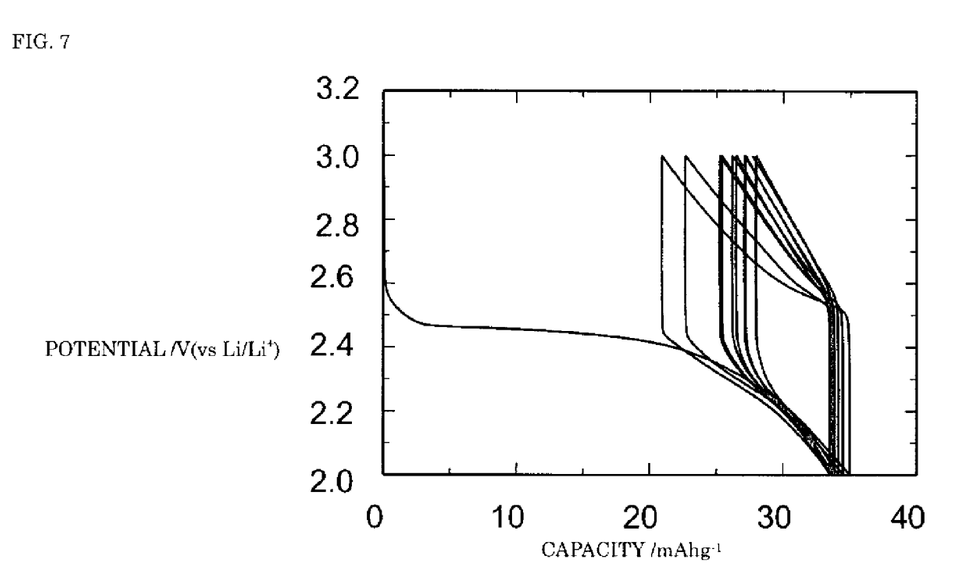
FIG. 7 is a graph showing charge-discharge cycle characteristics of glass ceramic powder according to Example 8.
Figure 8:
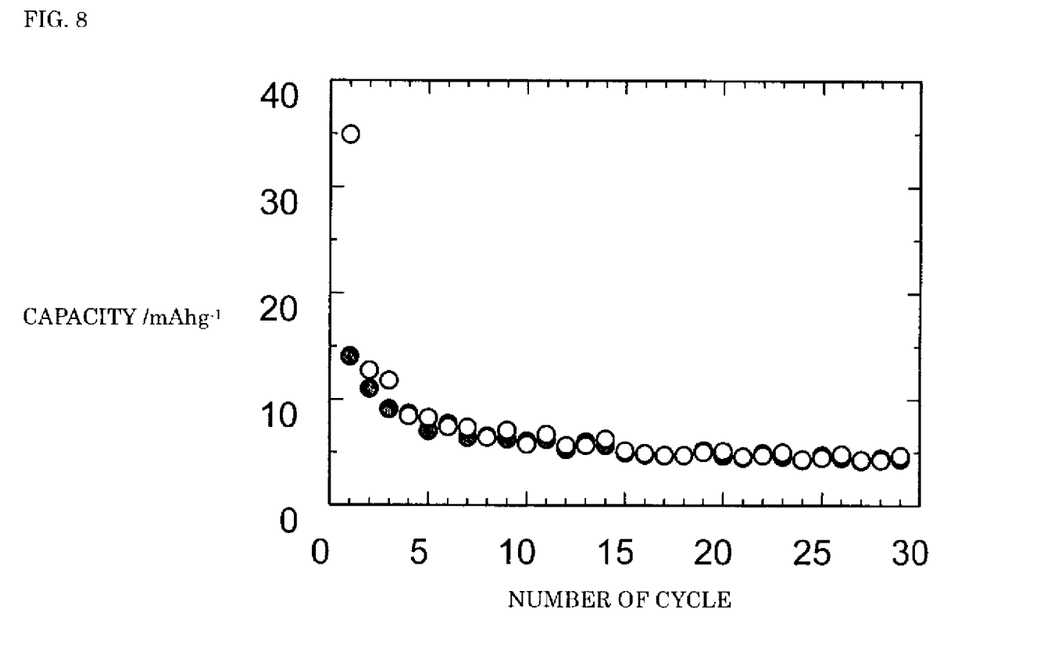
FIG. 8 is a graph showing capacity in every charge-discharge cycle of the glass ceramic powder according to Example 8.

Then, a potential of the negative electrode was measured while charge-discharge were performed in the following conditions. Consequently, as shown in FIGS. 7 and 8, it was turned out that the glass ceramic powder lost a function as a solid electrolyte by the first charge-discharge and acted as the electrode active material after that. Therefore, it showed that the solid electrolyte was decomposed by the first charge-discharge.

Charge conditions: 1 µA, 2.0 V
Discharge conditions: 1 µA, 3.0 V

In addition, in FIG. 8, a white circle is charge capacity (lithium insertion) and a black circle is discharge capacity (lithium desorption).

Example 9

A solid electrolyte $Li_{1.79}V_{0.56}Si_{0.44}O_{3.00}$ glass thin film with a thickness of 750 nm was formed on a platinum substrate under conditions of a pressure of 0.67 Pa, a laser irradiation energy of 200 mJcm$^2$, and an irradiation time of one hour with a laser abrasion device. The substrate served as a positive electrode and faced to a lithium metal as a negative electrode through the same electrolyte solution as one prepared by Example 4.

Figure 9:
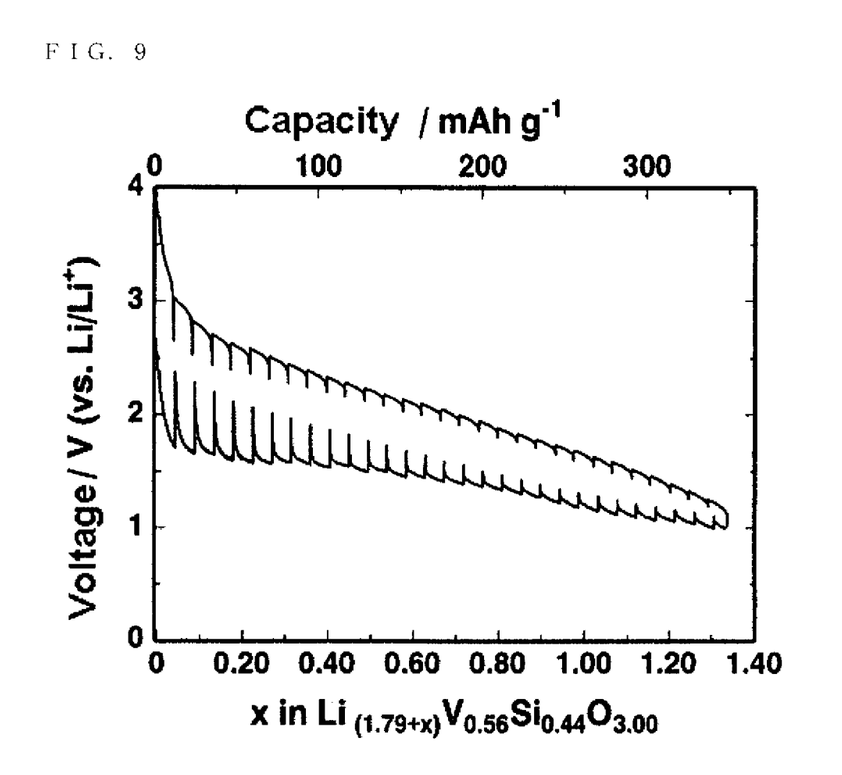
FIG. 9 is a graph showing an open circuit curve of a solid electrolyte $Li_{1.79}V_{0.56}Si_{0.44}O_{3.00}$ glass thin film according to Example 9.

Then, lithium insertion or desorption reaction was repeated at a constant interval in the following conditions and an open circuit voltage at that time was measured. Consequently, an open circuit curve as shown in FIG. 9 was obtained and it was turned out that the glass thin film showed insertion and desorption of lithium ion and acted as an electrode active material.

Electrolysis conditions when lithium insertion and desorption reaction was performed: 2.55 µAcm$^{-2}$ Each electrolysis time and interval: left for 10 hours after one hour electrolysis Example 10

Figure 10:
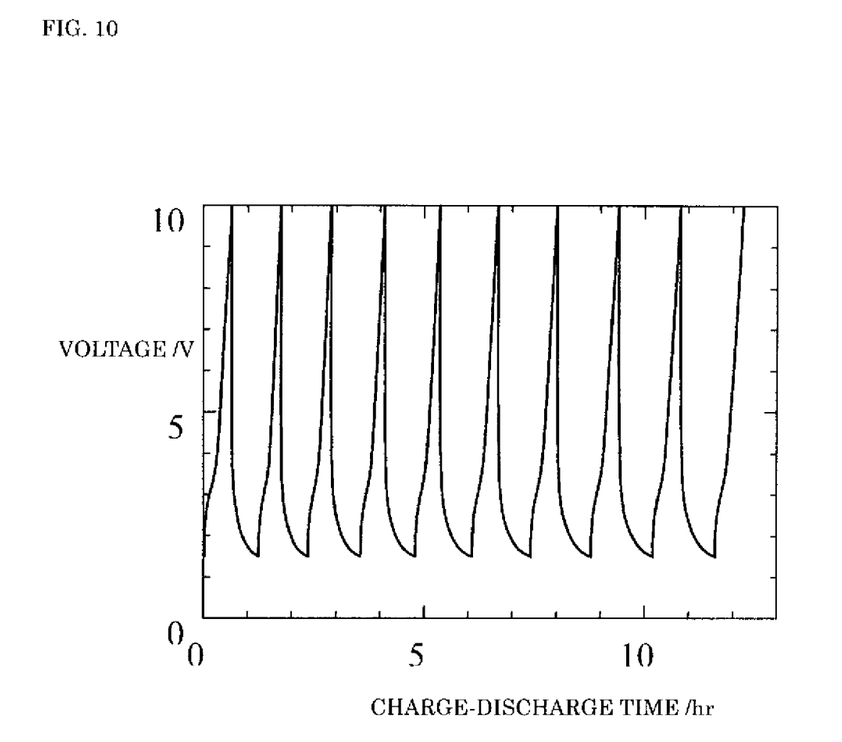
FIG. 10 is a graph showing a relationship between time and battery voltage when charging and discharging a battery assembly according to Example 10.

A multilayer body was prepared by accumulating five sheets of laminated bodies which were the same as one manufactured in Example 7 so that a manganese thin film of one laminated body came in contact with a copper thin film of the adjacent laminated body. Then, after the multilayer body was electrolyzed at a constant current of 10 µA for 250 seconds, it was electrolyzed at constant voltage of 16.2 V for 10 hours. After that, charge-discharge capacity was measured while an operation, in which the multilayer body was discharged at a constant current of 100 nA till a battery voltage became to 1.5 V and charged to 10 V, was repeated. The measured result is shown in FIG. 10. Although it shows that a charge-discharge curve is the same as Example 7, an average voltage of approximately 2.5 V (five times Example 7) was obtained. It showed that high voltage grouped batteries were able to be fabricated easily by increasing the number of the accumulating sheets.

The invention claimed is:

1. A method for manufacturing a lithium battery, the method consists of:
   providing a solid electrolyte containing a lithium ion,
   wherein the solid electrolyte is a compound represented by the general formula $Li_{4-x}V_xM_{1-x}O_4$ in which M is any of Si, Ti and Ge, and x is a number which is larger than 0 but smaller than 1,; and
   decomposing a surface of the solid electrolyte by a reaction to form an electrode active material directly on said surface.

2. The method according to claim 1, wherein the reaction is conducted by ion impact.

3. The method according to claim 1, wherein the reaction is conducted by oxygen ion impact.

4. The method according to claim 1, wherein the electrode active material does not contain lithium.

5. A method for manufacturing a lithium battery, the method consists of:
   providing a solid electrolyte containing a lithium ion,
   wherein the solid electrolyte is a solid electrolyte is a Li—Ti—Al—P—O based glass ceramic material; and decomposing a surface of the solid electrolyte by a reaction to form an electrode active material directly on said surface.

6. The method according to claim 5, wherein the reaction is conducted by oxidation, reduction, or a combination thereof, that arises from voltage application against the solid electrolyte.

7. The method according to claim 5, wherein the reaction is an electrolysis reaction.

8. A group of batteries, the group comprising a plurality of lithium batteries wherein each battery of the plurality is achieved by the method according to claim 5 connected in series.

9. The method according to claim 5, wherein the electrolyte active material does not contain lithium.

10. A method for manufacturing a lithium battery, the method consists of:
   providing a solid electrolyte containing a lithium ion, wherein the solid electrolyte is a solid electrolyte is a Li—Ti—Al—P—O based glass ceramic material; and
   decomposing a first surface of the solid electrolyte by a reaction to form a first electrode active material directly on said first surface; and
   decomposing a second surface of the solid electrolyte that is opposite to the first surface by said reaction to form a second electrode active material directly on said second surface.

11. The method according to claim 10, wherein the reaction is conducted by oxidation, reduction, or a combination thereof, that arises from voltage application against the solid electrolyte.

12. The method according to claim 10, wherein the reaction is an electrolysis reaction.

13. A group of batteries, the group comprising a plurality of lithium batteries wherein each battery of the plurality is achieved by the method according to claim 10 connected in series.

* * * * *